United States Patent [19]

Nissimov et al.

[11] Patent Number: 5,327,549

[45] Date of Patent: *Jul. 5, 1994

[54] DATA STORAGE SYSTEM INCLUDING A BIOS EXTENSION MEMORY ON AN ADAPTER BETWEEN A HOST COMPUTER AND DISK DRIVE

[75] Inventors: Haim N. Nissimov, West Hills; Brady Keays, Thousand Oaks, both of Calif.

[73] Assignee: Seagate Technology, Inc., Scotts Valley, Calif.

[*] Notice: The portion of the term of this patent subsequent to Sep. 21, 2010 has been disclaimed.

[21] Appl. No.: 89,427

[22] Filed: Jul. 8, 1993

Related U.S. Application Data

[63] Continuation of Ser. No. 818,279, Jan. 8, 1992, abandoned, which is a continuation of Ser. No. 487,026, Feb. 28, 1990, Pat. No. 5,247,633.

[51] Int. Cl.⁵ .................... G06F 13/00; G06F 12/00
[52] U.S. Cl. .................... 395/425; 395/500; 395/700; 395/275; 364/DIG. 2
[58] Field of Search .............. 395/425, 275, 500, 700

[56] References Cited

U.S. PATENT DOCUMENTS

| | | | |
|---|---|---|---|
| 4,399,503 | 8/1983 | Hawley | 395/325 |
| 4,494,156 | 1/1985 | Kadison et al. | 360/48 |
| 4,500,933 | 2/1985 | Chan | 360/69 |
| 4,509,118 | 4/1985 | Shenk | 395/775 |
| 4,527,262 | 7/1985 | Manto | 369/33 |
| 4,569,049 | 2/1986 | McNamara | 371/37.1 |
| 4,583,194 | 4/1986 | Cage | 364/419 |
| 4,591,997 | 5/1986 | Grabel | 395/155 |
| 4,680,653 | 7/1987 | Ng et al. | 360/72.2 |
| 4,707,750 | 11/1987 | Anderson et al. | 360/60 |
| 4,747,038 | 5/1988 | Bradley et al. | 395/250 |
| 4,773,036 | 9/1988 | Berens et al. | 395/425 |
| 4,780,866 | 10/1988 | Syracuse | 369/59 |
| 4,787,027 | 11/1988 | Prugh et al. | 395/275 |
| 4,805,090 | 2/1989 | Coogan | 395/275 X |
| 4,813,011 | 3/1989 | Kulakowski et al. | 395/275 |
| 4,858,038 | 8/1989 | Kazama | 360/69 |
| 4,928,193 | 5/1990 | Agoglia et al. | 360/78.04 |
| 4,972,364 | 11/1990 | Barrett et al. | 395/425 |
| 4,984,149 | 1/1991 | Iwashita et al. | 395/425 |
| 5,018,095 | 5/1991 | Nissimov | 395/425 |
| 5,077,683 | 12/1991 | Aydin | 364/708 |
| 5,247,633 | 9/1993 | Nissimov et al. | 395/425 |

OTHER PUBLICATIONS

*Hard Disk Heavyweights,* by Winn L. Rosch, Ziff-Davis Pub. Co., Jun. 9, 1987.
*Mastering DOS The Complete Tutorial and Up-to-Date User's Guide,* Second Edition, by Judd Robbins, Sybex Inc., Alameda, Calif. (pub. date unavailable).

Primary Examiner—Glenn Gossage
Attorney, Agent, or Firm—Kinney & Lange

[57] ABSTRACT

A data storage system includes a disc drive accessing system for accessing an entire storage capacity of a disk. The disk drive to be accessed is identified and address parameters for the disk are read from the disk by a host computer under instructions from a program in a Basic Input/Output System (BIOS) extension memory located on an adapter connected between the host computer and the disk drive. The address parameters read from the disk are used by the host computer to access each and every address location on the disk drive. The BIOS extension memory is activated by the BIOS memory upon power-up of the host computer.

8 Claims, 5 Drawing Sheets

DATA STORAGE SYSTEM INCLUDING A BIOS EXTENSION MEMORY ON AN ADAPTER BETWEEN A HOST COMPUTER AND DISK DRIVE

This is a continuation of application Ser. No. 07/818,279 filed on Jan. 8, 1992, now abandoned, which is a continuation of application Ser. No. 07/987,026 filed on Feb. 28, 1990, now U.S. Pat. No. 5,249,633.

BACKGROUND OF THE INVENTION

The present invention relates to hard disk storage systems. More particularly, the present invention relates to configuration of high capacity disk drives for being accessed.

Hard disk data storage systems contain one or more magnetic disks on which data is stored in sectors which lie in concentric tracks on the disks. A transducer (or head) flies above a track and writes, or magnetically encodes, the data in a sector on the track. The head is also capable of reading the magnetically encoded data from the sectors.

An electromechanical actuator operates within a negative feedback, closed-loop servo system. The actuator moves the head radially for track seek operations and holds the transducer directly over a track for track following operations.

Typically, a stack of disks is mounted on a spindle. Each surface on each magnetic disk has one corresponding head. All heads are moved together by the electromechanical actuator to different tracks on the disk surface. The collection of the tracks under all heads at any given radial position along the disk stack is known as a cylinder. Data read from the sectors by the heads is demodulated in a disk drive interface and provided to a host computer.

In the past, a serial or classical disk drive interface, (such as the Enhanced Small Device Interface (ESDI) or Seagate Technology 506 (ST 506) interface) demodulated the data read from the track on the magnetic disk and provided it in serial form. An additional component, known as a disk drive controller, checked the integrity of the data provided by the serial disk drive interface and converted the serial flow of data into a parallel flow. The parallel information was then provided by the disk drive controller to a host computer.

More recently, disk drive interfaces have been designed with more intelligence than the classical or serial disk drive interfaces. Examples of such intelligent disk drive interfaces are the Small Computer Systems Interface (SCSI) and PCAT (which was based on the Personal Computer AT (PC-AT) computer design) interfaces. Functionally, these intelligent interfaces and the disk drive controller have become part of the disk drive and provide parallel data to the host computer.

These intelligent interfaces have typically been coupled to the host computer at an input/output (I/O) slot. The I/O slot has, in the past, included a connector, coupled to the host computer, which ranged in size from 62 pins to 98 pins. An edge connector, coupled to the intelligent disk drive, having either 62 or 98 pins depending on the connector coupled to the host computer, was plugged into the I/O connector of the host computer.

However, continuing efforts to reduce size of both computers and disk drives has led to the development of disk drives which have only a 40 pin connector. In order to make these disk drives compatible with host computers that still have the 62 or 98 pin I/O connectors, an adaptor board has been developed which plugs into the I/O connector and converts the host computer system bus for compatibility with the 40 pin interface used by the disk drive. Also, a typical adapter board supports up to two disk drives connected in a master/slave configuration.

Most PC-AT type host computers are programmed to operate with a number of specific disk drive types. The PC-AT type host computer contains a table of disk drive types which correspond to the drive types with which the host computer will operate. That table contains the number of cylinders, heads and sectors per track for each drive type entered in the table. This table is fixed in the Basic Input/Output System (BIOS) Read Only Memory (ROM) located in the host computer.

A power-up program which is also stored in the BIOS ROM provides the disk drive controller with the disk drive parameters, from the table, which correspond to the drive type with which the host computer is programmed to operate. The disk drive controller then configures itself to match the table entry corresponding to the disk drive parameters provided by the power-up program.

However, all disk drive types included in the table in the International Business Machines (IBM) (Armonk, N.Y.) PC-AT computer use a sector number of 17 sectors per track. This fixed table imposes a limitation on the maximum disk drive capacity that the host computer can access. In other words, if the host computer cannot command a disk drive to configure itself for more than 17 sectors per track because of the fixed table in BIOS ROM, the computer is unable to access the maximum capacity of some high capacity disk drives which are installed for operation with the host computer. This is an increasing problem with the advances currently being made in enlarging disk capacity.

The computer typically addresses the disk drive through BIOS calls. Presently, typical BIOS programs allow up to 1024 cylinders, 16 heads and 64 sectors per track to be addressed. Hence, the maximum disk drive capacity addressable by BIOS is 1,048,576 blocks (536,870,912 bytes). But, if the computer cannot address more than 17 sectors per track because of the fixed list in BIOS, the addressable disk drive capacity is cut down to 278,528 blocks (142,606,336 bytes).

SUMMARY OF THE INVENTION

The present invention takes advantage of a built-in feature in a BIOS power-up program which orders a host computer to search for and execute BIOS extensions during a power-up sequence. By taking advantage of this built-in feature, the present invention adapts a disk drive accessing system for accessing a storage capacity on at least one disk drive.

A BIOS extension is provided. During execution of the BIOS extension, the disk drive to be accessed is identified and address or drive parameters for the disk drive are determined. The drive parameters are provided to the disk drive accessing system and are suitable for being used by the accessing system in accessing the storage capacity of the disk drive. The disk drive is then configured for being accessed using the drive parameters.

DETAILED DESCRIPTION OF THE PREFERRED EMBODIMENTS

Figure 1:
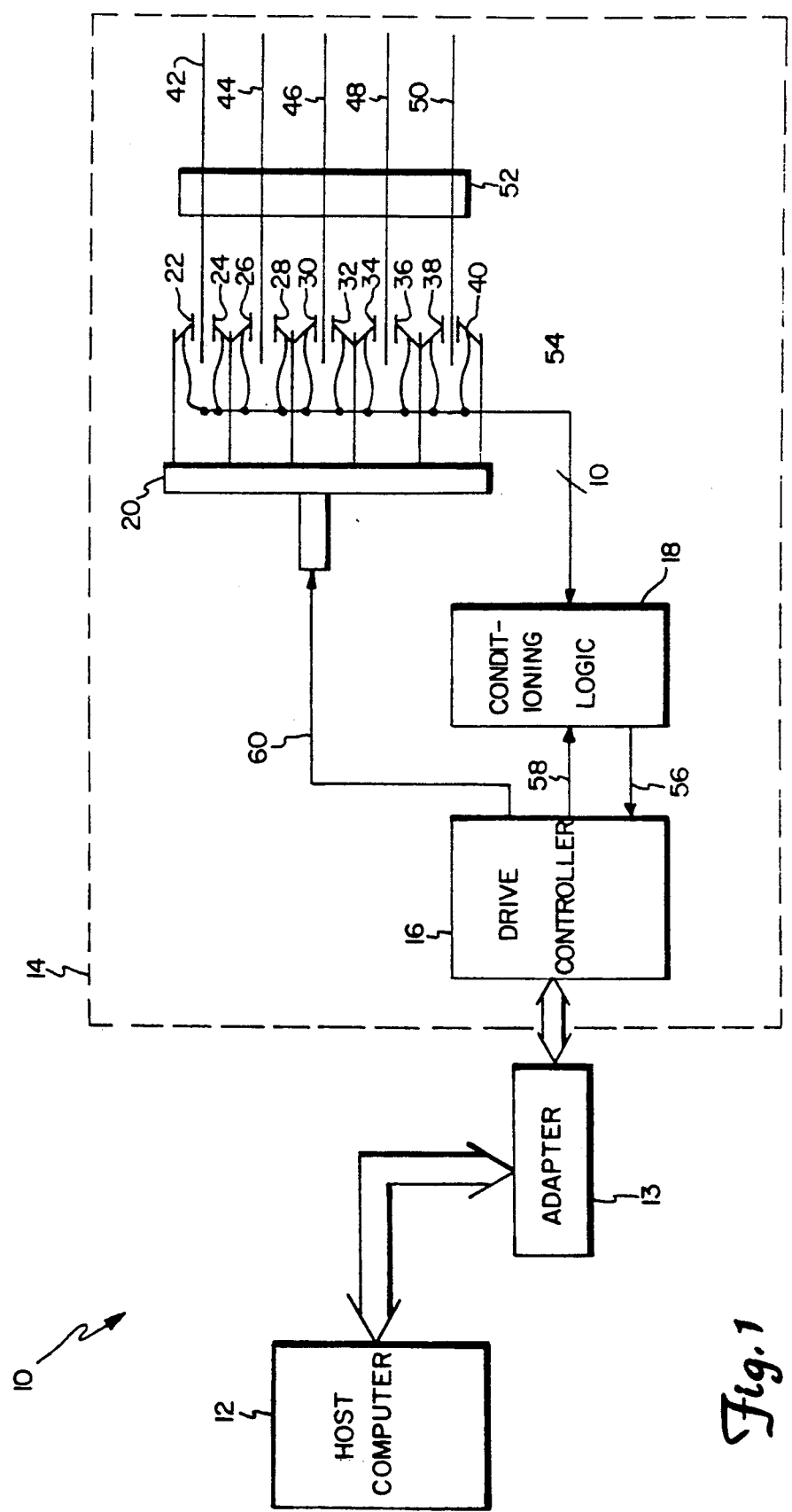
FIG. 1 is a block diagram of a data storage system.

FIG. 1 is a block diagram of hard disk data storage system 10 which includes host computer 12, adapter 13 and disk drive 14. Disk drive 14 includes drive controller 16, conditioning logic 18, rotary actuator 20, transducers or read/write heads 22, 24, 26, 28, 30, 32, 34, 36, 38 and 40 (heads 22-40), magnetic disks 42, 44, 46, 48 and 50 (disks 42-50) and spindle 52. During operation of disk drive 14, disks 42-50 spin with spindle 52. Heads 22-40 fly above disks 42-50 either reading magnetically encoded data from the surfaces of disks 42-50 or encoding (writing) information on the disk surfaces. While reading information, heads 22-40 produce signals representative of the data on the disk surfaces and provide those signals to conditioning logic 18. Conditioning logic 18 conditions the signals and provides them in serial form to drive controller 16. This flow of information from heads 22-40 to drive controller 16 is indicated by arrows 54 and 56.

Drive controller 16, in turn, converts the serial data received from conditioning logic 18 into parallel data and provides it to adapter 13. Adapter 13 adapts the information received from drive controller 16 for compatibility with a data bus in host computer 12. Host computer 12 also provides adapter 13 with control information for disk drive 14. Adapter 13 adapts the information received from host computer 12 for compatibility with drive controller 16. Based on that control information and position error information read from disks 22-40, drive controller 16 provides control signals to conditioning logic 18 and actuator 20. This is indicated by arrows 58 and 60.

The control signals provided by drive controller 16 to conditioning logic 18 dictate, for example, which signal produced by one of heads 22-40 should be chosen for demodulation by conditioning logic 18 and provided to drive controller 16. The control signals provided to actuator 20 cause actuator 20 to rotate. Rotation of actuator 20 causes heads 22-40 to move radially with respect to disks 42-50.

Figure 2:
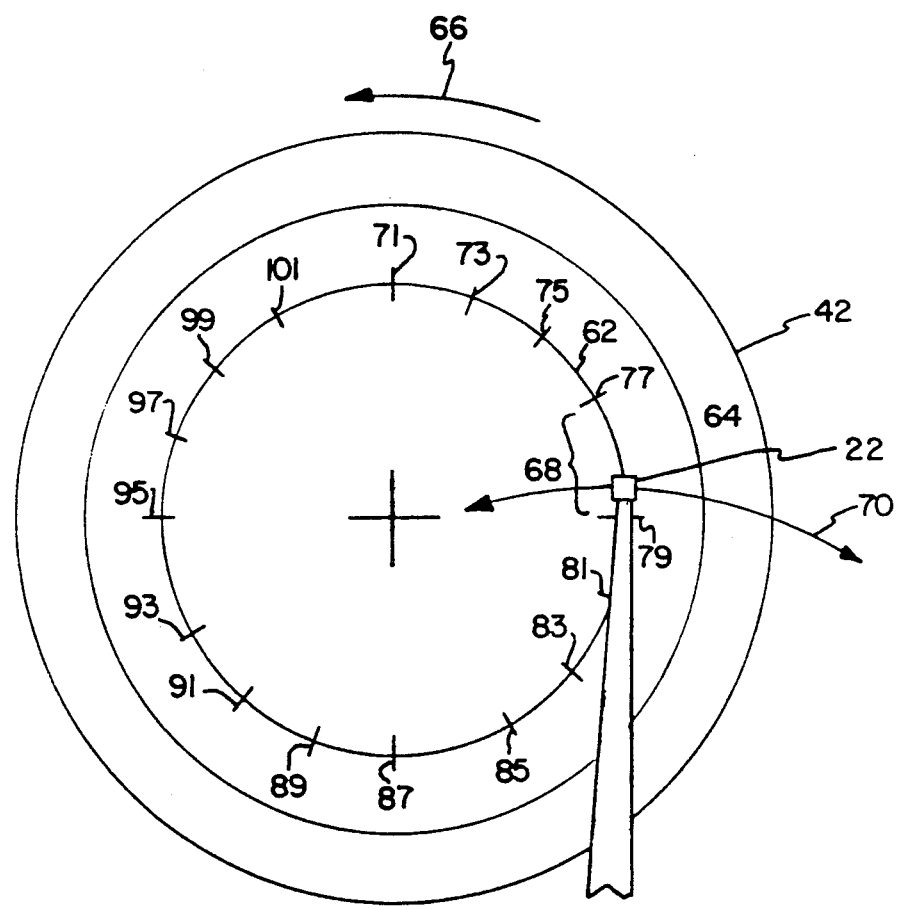
FIG. 2 is a top view of a disk in the data storage system shown in FIG. 1.

FIG. 2 shows a typical disk surface. The surface of disk 42 contains a plurality of tracks. For clarity, only two tracks, 62 and 64 are shown in FIG. 2. Each track on the surface of disk 42 is divided into sectors. The sector divisions on track 62 are indicated by the radially oriented slash marks 71, 73, 75, 77, 79, 81, 83, 85, 87, 89, 91, 93, 95, 97, 99 and 101. Head 22 is shown positioned over sector 68 of track 62 on disk 42. As disk 42 rotates in the direction indicated by arrow 66, head 22 flies above track 62 and data is read from or written to track 62.

As actuator 20 rotates and moves heads 22-40, head 22 moves radially with respect to disk 42 along an arc indicated by arrow 70. All heads are moved together as actuator 20 rotates. Therefore, heads 22-40 are simultaneously moved over corresponding tracks on each disk as actuator 20 rotates. The collection of tracks under heads 22-40 at a given radial position is known as a cylinder. Therefore, the number of cylinders and the number of tracks per surface on disks 42-50 is the same. Since the collection of the tracks under all heads 22-40 at any given radial position along the disk drive is known as a cylinder, the number of tracks per cylinder is the same as the number of heads 2-40 in disk drive 14.

An individual data sector on one of disks 42-50 is addressed by its cylinder address, head address and sector number. The term "address" implies a number in a sequence starting with 0. The term "number" implies a number in a sequence starting with 1. For example, the first sector available in disk drive 14 is addressed as cylinder 0, head 0 and sector 1. Hence, when host computer 12 accesses a particular sector or sectors on one of disks 42-50, it specifies to drive controller 16 the requested sector number, head address and cylinder address. Drive controller 16, in turn, causes actuator 20 to move heads 22-40 to the correct cylinder. Drive controller 16 also controls conditioning logic 18 to demodulate information from the correct head.

Figure 3A:
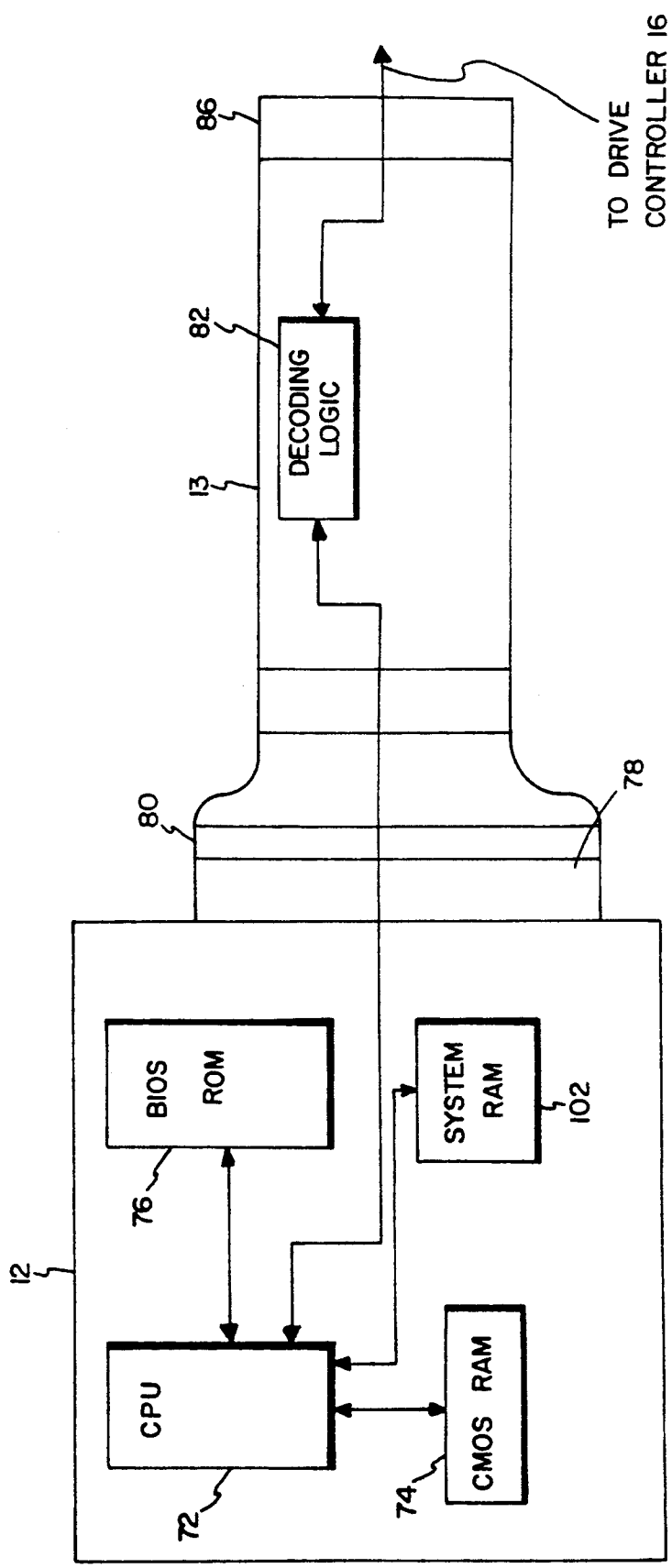
FIG. 3A is a more detailed block diagram of the host computer 12 and adaptor 13 of the prior art.

FIG. 3A is a more detailed block diagram of host computer 12 with an adapter 13 of the prior art. Host computer 12 includes Central Processing Unit (CPU) 72, Complementary Metal Oxide Semiconductor (CMOS) Random Access Memory (RAM), 74, BIOS ROM 76, system RAM 102, and, in this embodiment, 98 pin I/O connector 78. Adapter 13 includes 98 pin edge connector 80, decoding logic 82 and 40 pin connector 86. Decoding logic 82 adapts information sent by either CPU 72 or drive controller 16 for compatibility with the 98 pin data bus configuration of host computer 12, or the 40 pin data bus configuration of drive controller 16, respectively.

In this preferred embodiment, host computer 12 is a typical PC-AT type computer. Therefore, it contains a table of disk drive types which is fixed in BIOS ROM 76. The table defines the number of cylinders, heads and sectors per track for each drive type in the table. During power-up, CPU 72 accesses BIOS ROM 76 for power-up instructions. A BIOS power-up program causes CPU 72 to retrieve a drive type from CMOS RAM 74 which allows CPU 72 to retrieve the appropriate drive parameters from BIOS ROM 76. The location of the drive parameter table in BIOS ROM 76 is then stored by CPU 72 in the system RAM 102. The location of the table is then available to CPU 72 from system RAM 102 for as long as the computer remains powered. The drive parameters in BIOS ROM 76 corresponding to the drive type stored in CMOS RAM 74, themselves, correspond to the drive type which host computer 12 is configured to accept. Then, before accessing disk drive 14, CPU 72 retrieves the drive parameters stored in BIOS ROM 76 at the location indicated in BIOS RAM 102 and sends them, via adapter 13, to drive controller 16. Drive controller 16 then configures disk drive 14 for being accessed according to the drive parameters sent by CPU 72.

However, where the actual physical storage capacity of disk drive 14 is greater than any of the disk drive types present in the table in BIOS ROM 76, host computer 12 is incapable of accessing the entire physical storage capacity of disk drive 14. Hence, some of the physical storage capacity of disk drive 14 is wasted.

Figure 3B:
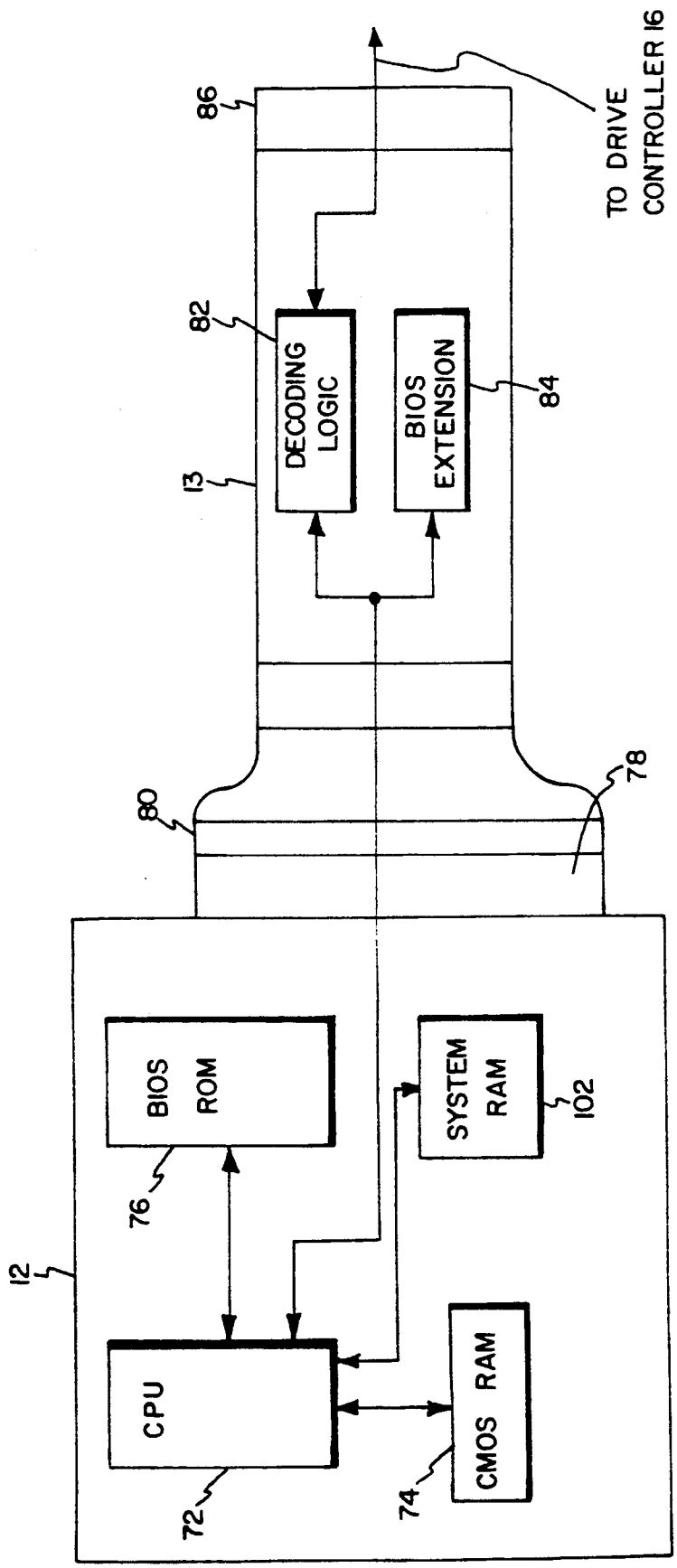
FIG. 3B is a more detailed block diagram of host computer 12 with adapter 13 of the present invention.

FIG. 3B is a block diagram of host computer 12 and adapter 13 of the present invention. The components of FIG. 3B are the same as those shown in FIG. 3A except that BIOS extension 84 is added to adapter 13.

When CPU 72 accesses BIOS ROM 76 during the power-up program, one of the operations in the power-up sequence is that CPU 72, after executing BIOS ROM 76, looks for any BIOS extensions which are to be accessed and executed during power-up. Upon looking for a BIOS extension, CPU 72 locates BIOS extension 84.

In this preferred embodiment, BIOS extension 84 is a programmable read only memory (PROM) containing several instructions. First, BIOS extension 84 instructs CPU 72 to interrogate disk drive 14 and identify its actual type (i.e., its actual physical configuration). This can be done either be retrieving a model number from drive controller 16 or by retrieving the actual physical capacity of disk drive 14. Then, CPU 72 is instructed to determine drive parameters, such as the number of cylinders, the number of heads and the number of sectors per track for disk drive 14. CPU 72 sends this information to drive controller 16 which, in turn, configures disk drive 14 for being accessed.

Also, BIOS extension 84 instructs CPU 72 to store the location of the drive parameters for the identified drive which are tabulated and stored in BIOS extension 84 into system RAM 102. Hence, after power-up, and during operation of data storage system 10, CPU 72 does not need to interrogate disk drive 14 each time it accesses disk drive 14. Rather, all of the essential drive parameters are stored in system RAM 102 for ready access by CPU 72.

Figure 4:
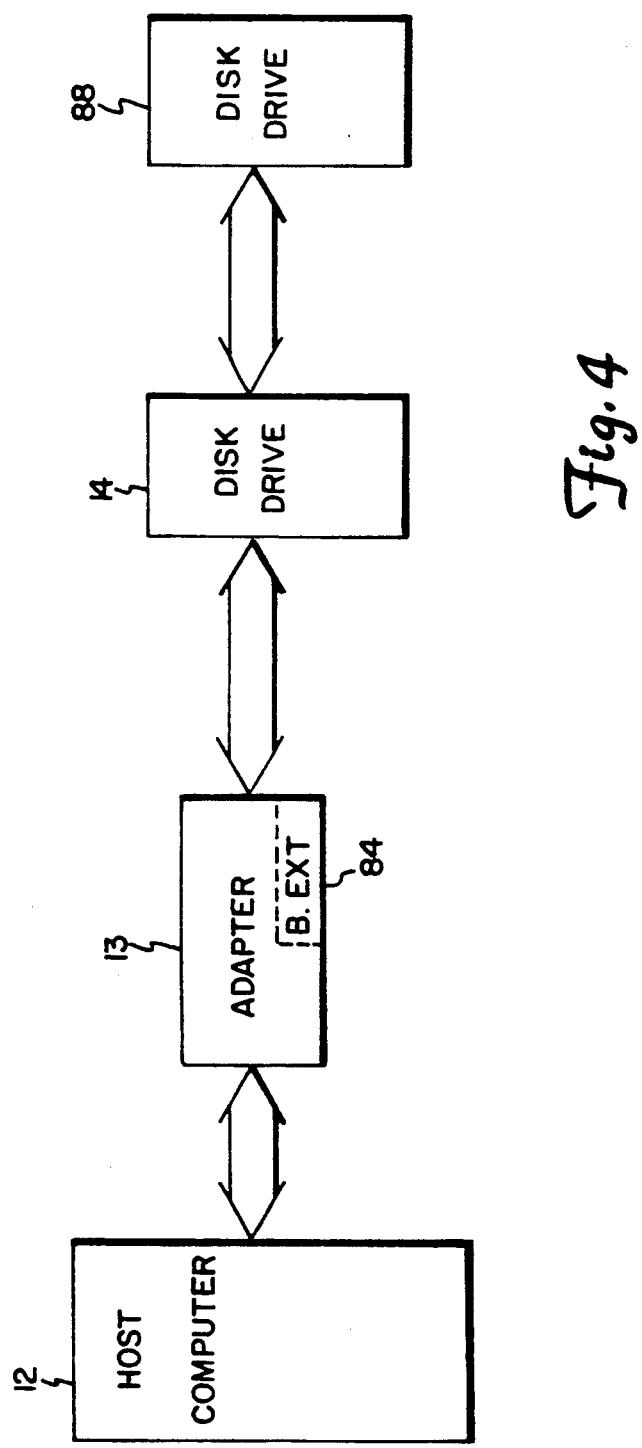
FIG. 4 is a block diagram of an alternative embodiment of a data storage system of the present invention.

FIG. 4 is a block diagram of another embodiment of the present invention. The data storage system shown in FIG. 4 is the same as that shown in FIG. 1 except that a second disk drive 88 is added to the data storage system. Disk drives 14 and 88 are coupled in a known master/slave relationship. BIOS extension 84 on adapter 13 operates the same way as described with reference to FIG. 3B except that it instructs CPU 72 not only to interrogate and determine drive parameters for disk drive 14 but also to interrogate and determine drive parameters for disk drive 88. The location of the drive parameters in BIOS extension 84 which are appropriate for drive 88 is stored in system RAM 102 as well.

The only additional step which must be taken is that host computer 12 must be initialized to recognize the number of drives attached. However, the type of drive attached and its corresponding drive parameters are automatically provided to CPU 72 by instructions in BIOS extension 84.

It should be noted that adapter board 13 is capable of being provided with hardware jumpers to allow the location of BIOS extension 84 in system memory to be selectable. This reduces the possibility of conflict with memory space occupied by other BIOS extensions located on other adapters 13.

CONCLUSION

The present invention allows the entire physical storage capacity of even high capacity disk drives to be utilized by a host computer. By using a BIOS extension to accomplish this, the high capacity disk drives used are automatically integrated into an existing computer system. This eliminates rewriting the BIOS stored in BIOS ROM 76 and thereby possibly creating other problems in the operating system of host computer 12.

Also, by mounting BIOS extension 84 on adapter 13, hardware need not be added to mother boards in host computer 12. This eliminates any redesign or relayout of the hardware in host computer 12.

In addition, many customers who contemplate buying high capacity disk drives require that they have a chance to evaluate the disk drives before purchasing them. With the present invention, adapter 13 can be coupled to any high capacity disk drive and the disk drive can be evaluated to determine whether the disk drive meets desired performance parameters with no change whatsoever to the potential customer's system.

Also, the present invention allows future disk drive designs, with even larger capacities, to be automatically integrated with existing host computer systems. No additional programming is required of the BIOS in BIOS ROM 76 or that in BIOS extension 84. This allows the full capacity of these disk drives to be used even in systems which lack appropriate drive type tables in BIOS ROM 76.

Although the present invention has been described with reference to preferred embodiments, workers skilled in the art will recognize that changes may be made in form and detail without departing from the spirit and scope of the invention.

What is claimed is:

1. A data storage system, comprising:
    a disk drive having address locations for storing data, the disk drive having address parameters, the address parameters including information pertaining to a capacity of the disk drive;
    a host computer which accesses the address locations on the disk drive to retrieve data from the disk drive and to write data to the disk drive, the host computer including a basic input/output system (BIOS) memory containing predetermined address parameters corresponding to a plurality of types of disk drives; and
    an adapter connecting the host computer to the disk drive, the adapter including:
       a basic input/output system (BIOS) extension memory storing a program, the host computer being responsive to the program to interrogate the disk drive to determine the type of the disk drive and to read address parameters from the disk drive, the host computer being responsive to the address parameters from the disk drive to allow the host computer to access each and every address location on the disk drive.

2. The data storage system of claim 1 wherein information indicating a location of the revised address parameter table is transferred by the host computer from the BIOS extension memory to a system memory storing the operating instructions and wherein the information indicating the location of the revised address parameter table replaces information containing a location of the address parameter table in the system memory.

3. The data storage system of claim 1 wherein the BIOS extension memory is activated upon power-up by the BIOS memory in the host computer.

4. The data system of claim 1 wherein the host computer comprises:
    a processor connected to the BIOS extension memory, the BIOS memory being connected to the processor so that the BIOS memory instructs the host computer to locate the BIOS extension memory.

5. The data storage system of claim 4 wherein the BIOS memory comprises:
    an address parameter table containing predetermined address parameters corresponding to the capacity of the disk drive.

6. The data storage system of claim 3 wherein the BIOS extension memory stores a program for instructing the host computer to identify the disk drive and revise the address parameter table to correspond to the disk drive identified.

7. In a data storage system comprising:
a disk drive having address parameters;
a host computer; and
a basic input/output system (BIOS) having a basic input/output system (BIOS) memory;
the improvement comprising an adapter connected between the host computer and the disk drive, the adapter including:
a basic input/output system (BIOS) extension memory storing a program, the host computer being responsive to the program to interrogate the disk drive to determine the type of the disk drive and to read address parameters from the disk drive, the host computer being responsive to the address parameters from the disk drive to allow the host computer to access each and every address location on the disk drive.

8. The data storage system of claim 7 wherein information indicating a location of the address parameters is transferred by the host computer from the BIOS extension memory to a system memory storing operating instructions and wherein the information indicating a location of revised address parameters replaces information containing the address parameters in the system memory of the data storage system.

* * * * *

UNITED STATES PATENT AND TRADEMARK OFFICE
CERTIFICATE OF CORRECTION

PATENT NO. : 5,327,549

DATED : July 5, 1994

INVENTOR(S) : HAIM N. NISSIMOV, BRADY KEAYS

It is certified that error appears in the above-indentified patent and that said Letters Patent is hereby corrected as shown below:

Col. 1, line 4, before "DISK", INSERT --A--

Col. 1, line 9, delete "07/987,026", insert --07/487,026--

Col. 1, line 10, delete "5,249,633", insert --5,247,633--

Col. 4, line 6, delete "heads 2-40", insert --heads 22-40--.

Col. 7, line 1, delete "claim 3", insert --claim 5--

Signed and Sealed this

Twenty-ninth Day of November, 1994

Attest:

BRUCE LEHMAN

*Attesting Officer*    *Commissioner of Patents and Trademarks*